United States Patent
Olsson et al.

(10) Patent No.: US 8,635,670 B2
(45) Date of Patent: Jan. 21, 2014

(54) SECURE CENTRALIZED BACKUP USING LOCALLY DERIVED AUTHENTICATION MODEL

(75) Inventors: Steve E. Olsson, Camano Island, WA (US); Prathibha Kundavaram, Hyderabad (IN); Rajat Talwar, Gurgaon (IN); Kiran Chava, Hyderabad (IN); Sundararajan Aravamdhan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1267 days.

(21) Appl. No.: 12/121,804

(22) Filed: May 16, 2008

(65) Prior Publication Data

US 2009/0288146 A1    Nov. 19, 2009

(51) Int. Cl.
*G06F 21/00*    (2013.01)

(52) U.S. Cl.
USPC .............. 726/4; 726/5; 726/6; 726/9; 726/29; 713/153; 713/170; 709/203; 709/226; 380/28

(58) Field of Classification Search
USPC ...................................... 726/4, 29
See application file for complete search history.

(56) References Cited

U.S. PATENT DOCUMENTS

| | | | |
|---|---|---|---|
| 6,442,695 B1 * | 8/2002 | Dutcher et al. ................... 726/4 |
| 6,574,733 B1 | 6/2003 | Langford | |
| 7,185,192 B1 * | 2/2007 | Kahn ............................ 713/155 |
| 7,222,233 B1 | 5/2007 | Rubin | |
| 7,222,361 B2 | 5/2007 | Kemper | |
| 7,308,709 B1 | 12/2007 | Brezak, Jr. et al. | |
| 7,926,087 B1 * | 4/2011 | Holl et al. ........................ 726/2 |
| 2005/0154915 A1 | 7/2005 | Peterson et al. | |
| 2006/0075476 A1 * | 4/2006 | Hajji et al. ....................... 726/6 |
| 2006/0095958 A1 * | 5/2006 | Lehinger et al. .................. 726/6 |
| 2006/0224890 A1 | 10/2006 | Zhou et al. | |
| 2007/0038884 A1 | 2/2007 | Campbell et al. | |
| 2007/0100913 A1 * | 5/2007 | Sumner et al. ................ 707/204 |
| 2007/0203957 A1 * | 8/2007 | Desai et al. ................... 707/204 |
| 2007/0204104 A1 | 8/2007 | Wan et al. | |
| 2007/0250918 A1 | 10/2007 | Aboual Chamat | |
| 2008/0016148 A1 | 1/2008 | Lora et al. | |
| 2008/0091747 A1 * | 4/2008 | Prahlad et al. ................ 707/204 |
| 2008/0154989 A1 * | 6/2008 | Arman .......................... 707/204 |
| 2009/0222509 A1 * | 9/2009 | King et al. .................... 709/203 |
| 2009/0222896 A1 * | 9/2009 | Ichikawa et al. ................. 726/6 |

OTHER PUBLICATIONS

Hill, "Backup so Easy Even your Users can do it", Dated: Jun. 10, 2004, http://www.networkcomputing.com/showitem.jhtml?articleID=21700171&pgno=4.
Cooksey, "Oracle Secure Backup: Optimized for Oracle Environments", An Oracle White Paper, Dated: Apr. 2006, pp. 1-9.
"Data Backup", Intelligent Computer Solutions, Web Page downloaded on Jan. 29, 2008, 2 Pages.

* cited by examiner

*Primary Examiner* — Morshed Mehedi

(57) ABSTRACT

A system and method for performing backup operations is provided. Mechanisms facilitate a secure centralized backup system with a locally derived authentication model. A local centralized storage server may generate an authentication model, including credentials, and create a share/directory for each client. Clients store their credentials and use them to access centralized storage. Credentials are maintained and provisioned locally. A remote host server may establish trust by providing a list of clients in a circle.

14 Claims, 5 Drawing Sheets

SECURE CENTRALIZED BACKUP USING LOCALLY DERIVED AUTHENTICATION MODEL

TECHNICAL FIELD

The present invention relates generally to computer systems, and, more particularly, to backup and authentication.

BACKGROUND

The use of data backups for personal computers is becoming increasingly important. Users are storing information that may be difficult or costly, to recreate. Digital photos, correspondence, schoolwork, business or professional documents, and financial documents are examples of the types of digital data that is vulnerable to loss due to mechanical failures, theft, fire, or other events. It is beneficial to regularly back up this type of data.

Some users back up their data on CDs, portable disk drives, flash memory, or other devices. Users must organize this data so that it is not lost, stolen, or damaged. Maintaining multiple backups on different devices may create security problems if private information is lost.

Some large organizations may have a logical group of computers called a domain, along with a domain controller. A domain controller is a server that manages security authentication requests within the domain, such as logging in to the network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, user interface, and components operate to facilitate performing secure backups of client computers. A system may provide a centralized mechanism for storing backup data and providing secure access to the stored data. Mechanisms described herein may be employed in a configuration having multiple computers in a home, small business, or small organization. A method for such purpose may include one or more actions to enable a user to configure a storage server and a set of client computers to perform backups or restore operations at a storage device associated with the storage server. The method may further include actions to configure client devices with credential information to be employed by the client devices when accessing the storage device.

A system may include a circle of clients and a storage server that are all located locally to each other, a storage depository connected with the storage server, and a host server remote to the clients and storage server, accessible over a wide area network or other remote communications mechanism. The storage server may perform actions including retrieving a list of clients from the host server, generating credentials including a username and password for each client, creating a share and directory for each client, and providing the credentials and share/directory information to each client. In response to a request by a client, the storage server may authenticate the client's credentials, to determine whether the credentials are verified and selectively enable the client to access its corresponding directory to perform backup operations.

A client device may perform actions including receiving and storing its credentials, and at a later time sending its credentials to the storage server to authenticate itself. A host server may facilitate processes by maintaining a list of clients in a circle, and sending the list to a storage server upon request. The circle may be defined based on a subscription to a service associated with the host server. The host server may also receive, from the storage server, client credentials, store the credentials, and provide them to each client upon request. This enables a client to perform backup operations when it is unable to receive credentials from the storage server.

One aspect of a system described herein is that the authentication model is provisioned locally, with trust information received from the host server. Mechanisms described herein enable clients to perform backup operations without use of a domain controller.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
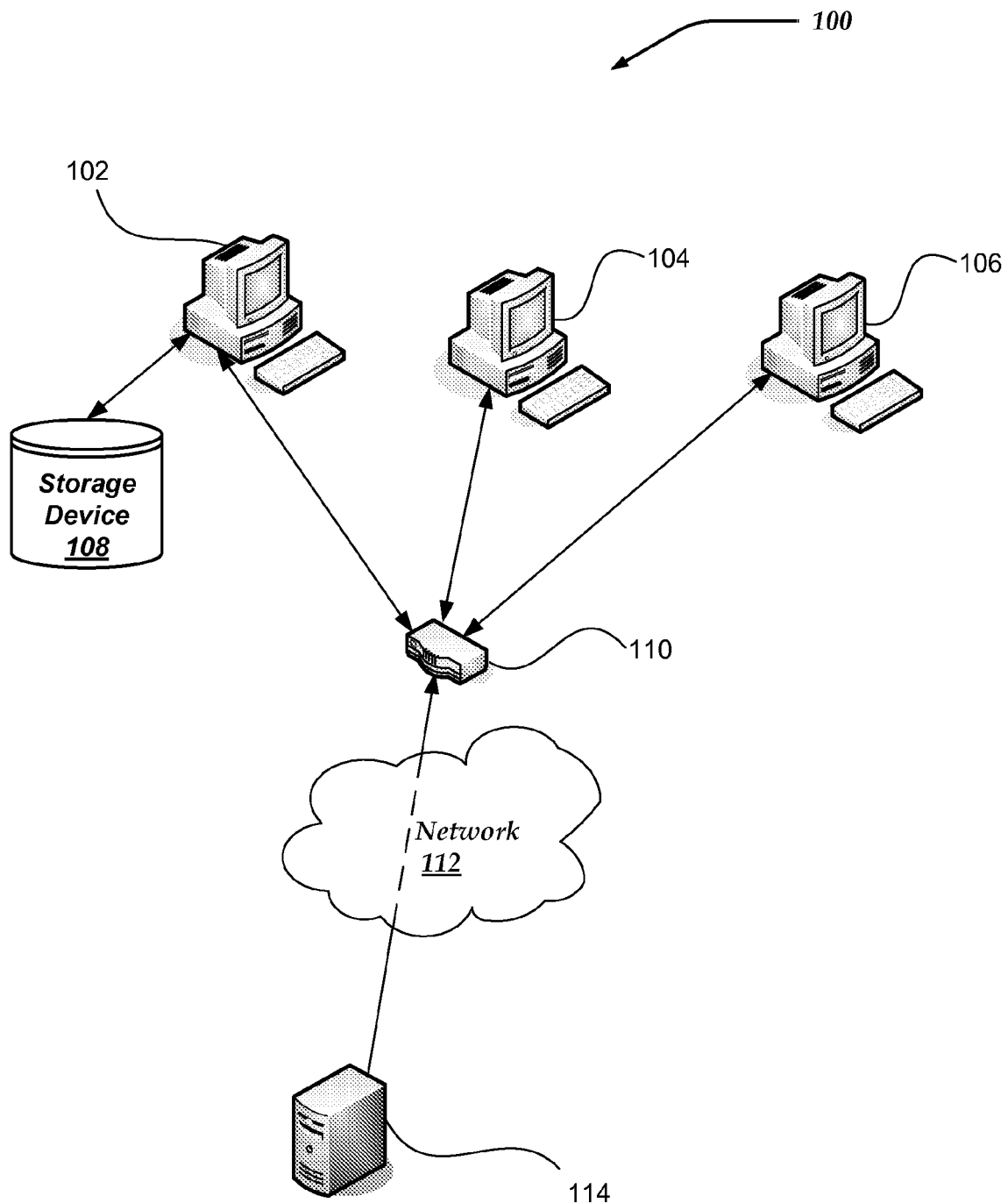
FIG. 1 shows one embodiment of a system implementing aspects of the present invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices.

Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "backup operation" refers to an operation of one or more of performing a backup of data, restoring data from a backup storage, viewing contents of a backup storage, managing backup data, or the like.

As used herein, the term "authenticate" refers to a process of attempting to verify the identity of an object, such as a client device. After authentication, the target object's identity may be verified or not verified.

As used herein, the term "credentials" refers to digital data that may be used to authenticate an object, such as a client device. Where credentials verify the identity of a target object, it may be said that the credentials are verified (with respect to the object), the object's identity is verified, or simply that the object is verified.

As used herein, the term "local" describes a relationship between two or more computing devices wherein the devices are physically located in a small geographic area, such as a home, office, or a building, and communicate with each other over a local area network or without using a network, such as by wired or wireless mechanisms. The term "remote" describes a relationship that is not local, such as communication over a wide area network, global network, or combinations thereof.

The components may execute from various computer readable media having various data structures thereon. The components may communicate via local or remote processes such as in accordance with a signal having one or more data packets (e.g. data from one component interacting with another component in a local system, distributed system, or across a network such as the Internet with other systems via the signal). Computer components may be stored, for example, on computer readable media including, but not limited to, an application specific integrated circuit (ASIC), compact disk (CD), digital versatile disk (DVD), read only memory (ROM), floppy disk, hard disk, electrically erasable programmable read only memory (EEPROM), flash memory, or a memory stick in accordance with embodiments of the present invention.

FIG. 1 is a block diagram of a backup system 100, in accordance with some aspects of the present invention. Backup system 100 is only one example of a suitable system and is not intended to suggest any limitation as to the scope of use or functionality of the present invention. Thus, a variety of system configurations may be employed without departing from the scope or spirit of the present invention.

As shown in the figure, backup system 100 includes a storage server 102 having a data repository 108 directly or indirectly connected thereto. Storage server 102 is a computing device having one or more processing units and associated components. The term computing device encompasses servers, personal computers, laptop computers, handheld computers, PDAs, handheld computers, cell phones, smart phones, or other computing devices having one or more processors. Data repository 108 may comprise one or more storage devices. Each storage device may be a device having one or more types of non-volatile memory, such as disk drives, solid state memory, or the like. In one embodiment, the storage device supports access control lists. The use of access control lists with the storage device is described below.

The backup system 100 may include one or more client computers, such as clients 104 and 106. Client computers 104 and 106 are computing devices, and may be the same types of computing devices as each other and storage server 102, or each may be a different type of computing device. Thus, the system 100 may be employed with heterogeneous or homogenous sets of computing devices. The set of clients 104-106 is referred to as a "circle" of clients or devices, in which there is a level of trust among the devices. A circle may be defined by a grouping such as a shared subscription to a service, or by another defined grouping.

In one embodiment, storage server 102 may itself be a client device and perform functions of a client device in addition to functions of a storage server. Though the discussion herein refers to storage server 102, unless explicitly stated otherwise, it is to be understood that storage server 102 may also perform at least some of the functions described herein with respect to client devices. In one embodiment, at least some of the functions of storage server 102 may be distributed among two or more computing devices, and any one or more of these computing devices may also be client devices.

In brief, one embodiment of a computing device that may be employed includes one or more central processing units (CPU), a video display adapter, and a mass memory, all in communication with each other via a bus. The mass memory may include a random access memory (RAM), a read only memory (ROM), one or more permanent mass storage devices, removable media, or a combination thereof. Mass storage devices may include a hard disk drive, optical drive, flash memory, or a floppy disk drive. The mass memory may include a general-purpose operating system, application programs, security programs, communication programs, or other computer programs. The computer programs may include a compiler, an interpreter, a debugger, version control software, or other software used to develop computer programs.

One embodiment of a computing device may include a network interface unit, drivers, or other software for communicating with remote devices. The computing device may employ one or more of various wired or wireless communication protocols, such as IP, TCP/IP, UDP, HTTP, SSL, WAP, Bluetooth, or the like. Communications may use direct connections, local area networks, wide area networks such as the Internet, wireless networks, or a combination thereof.

In one embodiment, each of client devices 104-106 and storage device 102 communicates with a router 110, which serves as an intermediary network device facilitating communication between the devices and a wide area network 112 such as the Internet. In one embodiment, each of client devices 104-106 and storage device 102 are located on a common local area network (LAN). Client devices 104-106 and storage device 102 may communicate with each other through router 110. They may communicate with each other directly or indirectly using wired communication mechanisms, wireless communication mechanisms, or a combination thereof.

In one embodiment, one or more of clients 104-106 or storage server 102 may communicate with network 112 through a router other than router 110, such that not all of the circle and the storage server communicate through the same router. On some embodiments, one or more of the clients or storage server may communicate with network 112 without using a local router. Clients 104-106 and storage server 102 may communicate with each other through a local router or directly, using a wireless or wired technology.

Clients 104-106 and storage server 102 may be part of a home or small business network, in which all of these devices are collocated. Each of these devices may be considered local to the others. The set of clients, referred to as a "circle" of clients, may share a subscription to a remote service. The remote service may, for example, provide software to each client that may be used to provide security, backup services, sharing of printers, or the like. Windows Live™ One-Care™, provided by Microsoft Corporation, is one example of such a service.

As illustrated in FIG. 1, a backup system 100 may further include a host server 114. Host server 114 is a computing device that may communicate with storage server 102 and each of client devices 104-106. In one embodiment, illustrated in FIG. 1, host server 114 communicates with storage server 102 and client devices 104-106 across wide area network 112. In one embodiment, host server 114 receives client authentication information from storage server 102 and sends client authentication information corresponding to each client 104 or 106 to the respective client device, thereby enabling the client device to perform authentication operations as part of, or prior to, a backup process. Details of these processes are discussed in further detail herein.

Though FIG. 1 illustrates a single host server 114, the functions of host server 114 may be distributed across multiple computing devices, each such host server being either local or remote from other host servers. Multiple host servers 114 may redundantly store data corresponding to a storage server or client device, in order to provide high availability of such data in the event that one or more fails or is unavailable when needed. Multiple host servers 114 may also balance the load that results from supporting many backup systems such as backup system 100. A plurality of host servers 114 may also allow processes to operate efficiently when one is heavily loaded, components of network 112 fail or are congested, or the like. A host server 104 may employ one or more additional computing devices, storage devices, or other components to perform at least some of the operations described herein and attributed to the host server 114. The use of one or more servers on a wide area network providing services to client devices, where the location of the servers may be transparent to the client devices, is sometimes referred to as part of "the cloud" of available computing devices and services.

In the backup system 100, communication between any of the clients 104-106 and storage server 102 or host server 114 may use any one or combination of wired or wireless technologies, some of which are described herein. Any of a variety of query and communication protocols may be employed to communicate with, and exchange data among the computing devices of system 100. In addition to the exemplary backup system 100, the invention may be practiced in a number of variations of system configurations.

Figure 2:
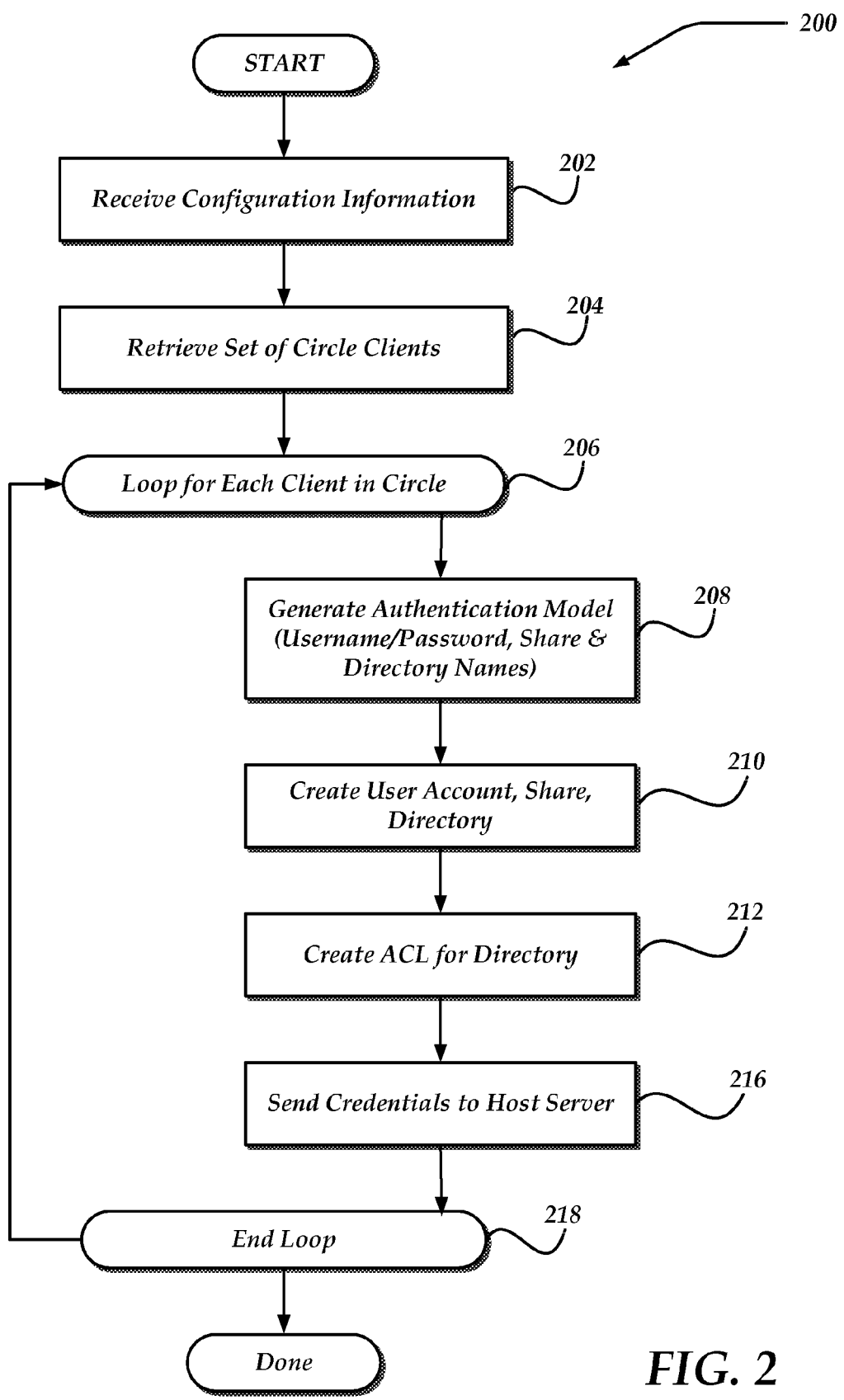
FIG. 2 is a logical flow diagram generally showing a process for initializing a backup system, in accordance with an embodiment of the present invention.

FIG. 2 is a flow diagram illustrating a process 200 of configuring and initializing a backup system such as backup system 100. System 100 may employ at least a portion of the components illustrated in FIG. 1. It may employ any of the system variations discussed herein, or it may be performed with other systems.

As illustrated in FIG. 2, process 200 may begin, after a start block, at block 202, where the storage server 102 receives configuration information related to backup system 100. In one embodiment, the configuration information, or at least a portion thereof, is received from a user of the storage server during, or as a result of, a configuration process. The user may, for example, specify a schedule for performing backups on each client 104-106. The schedule may be the same for each client device, or it may vary. Configuration information may include specifications of which files or data to back up. This may include, for example, a specification of directory locations, file names, types of files, data ranges, file sizes, or other criteria for filtering files. It may include a specification of whether to perform incremental backups, complete backups, or both, according to a schedule. In one embodiment, predetermined default values may be used as part of the configuration information unless overridden by a user. In one embodiment, the user configuring the system has administrative rights to the storage server. In one embodiment, at least a portion of the configuration information may be received by the storage server from a local or remote device.

Process 200 may flow to block 204, where identification of a set of client devices in the circle is retrieved. In one embodiment, the storage server 102 may request a list from a remote online device such as the host server 114. The circle may be defined as a set of clients sharing a subscription to a service or having linked subscriptions to a service, such as one provided by the host server or associated servers. The storage server may retrieve a list of client devices from an online server that provides the subscription service.

In one embodiment, a list of client devices may be generated locally. For example, the storage server may automatically detect client devices that are located on the local area network, and form the list of clients from those detected. This mechanism may include communicating with each detected client device to determine whether it is capable or authorized to participate in the processes described.

Process 200 may flow to block 206, where a loop begins, referred to herein as loop 206. Loop 206 iterates over each client of the client circle. The client being iterated over is referred to as the current client. In the flow illustrated in FIG. 2, action blocks 208 to 216 are performed within loop 206.

Process 200 may flow to block 208, where storage server 102 creates an authentication model for the current client. In one embodiment, an authentication model includes a share ID, a directory ID, a username, and a password. The storage server 102 may generate a share name, a directory name, a username, and a password for the current client. The combination of username and password may be referred to as credentials and is to be used to access the corresponding share and directory on data repository 108.

Processing may flow to block 210, where storage server 102 creates an account for the current client, and creates a share and directory on data repository 108 corresponding to the current client. The share and directory correspond to the share name and directory name generated at block 208. The account corresponds to the username generated at block 208 and may employ the username or a derivation thereof as the account name. The corresponding password generated at block 208 or a derivation thereof may be set as the password for access to the share and directory. In some implementations, the created share or directory may be hidden, so that it cannot be detected by clients outside of the circle, or even by clients other than the client with the correct credentials.

Processing may flow to block 212, where an access control list (ACL) is created for the share/directory combination created at block 210. Briefly, an ACL is a specification that indicates, to an operating system, permissions or access rights that a user may have to a file or directory. An ACL may include one or more access control entries (ACE), where an ACE indicates access rights for a specific user or group of users. In one embodiment, the storage server may create an ACE that specifies the specific client has rights to read or write to the client's corresponding directory. In one embodiment, a second ACE may be created that provides a system administrator with access rights to the directory. The second ACE may provide the system administrator with the same access rights as the client, with additional rights, or with less rights than the client. For example, either the client or the system administrator or both may be provided with a right to reset a client's password. In some implementations, client devices other than the specific client corresponding to a share and directory are not provided with access rights to the specific client's share and directory. This may be enforced by the authentication of credentials, and may allow for replacement client devices as described herein.

Though not illustrated in FIG. 2, in one embodiment, the storage server 102 may send the authentication model, including credentials, share and directory names, as well as additional backup configuration information, to the current client.

However, in some environments, one or more clients may be unavailable to receive backup configuration information and the authentication model from the storage server. These clients may receive this information at a later time from a host server, as described herein.

Processing may flow to block 216, where the authentication model corresponding to the current client is sent to host server 114. In one embodiment, the authentication model and other backup configuration information, or at least a portion thereof, may also be sent to host server 114. Host server 114 may send the authentication model or backup configuration information to each client, as needed by the client, at a subsequent time during communication with the client. Host server 114 may send portions of the information to a client at different times.

In one embodiment, the credentials include a username and password combination that is not disseminated to other clients. The backup configuration information may include backup schedules, specifications of files to be backed up, types of backups, or the like. The backup configuration information may include the share and directory names corresponding to the client.

Processing may flow to block 218, which terminates loop 206. If there are additional clients of the circle to iterate over, processing may flow back to the beginning of loop 206, to continue processing the next client. If there are no additional clients of the circle to iterate over, the processing may exit the loop and flow to a done block, where the backup initialization process terminates or returns to a calling program.

It is to be noted that, although the actions of blocks 208-216 are shown within a loop, various implementations may perform any one or more of these actions outside of the loop, employ multiple loops, or perform the actions using techniques other than loops. In one implementation, multiple threads may be used to perform actions corresponding to each client of the circle. Some of the actions of loop 206 may be performed concurrently, and the order of operation may vary.

Though not illustrated in FIG. 2, in response to receiving the authentication model of each client, as sent by the storage server, a host server may store the authentication model so that it can later be sent to the corresponding client. Additionally a host server, or an associated server, may download one or more software components to the storage server or client devices, enabling them to perform the processes discussed herein. In one embodiment, the actions of blocks 202-218, or a portion thereof, may be performed by an authentication manager 506 (FIG. 5) in a storage server.

Figure 3:
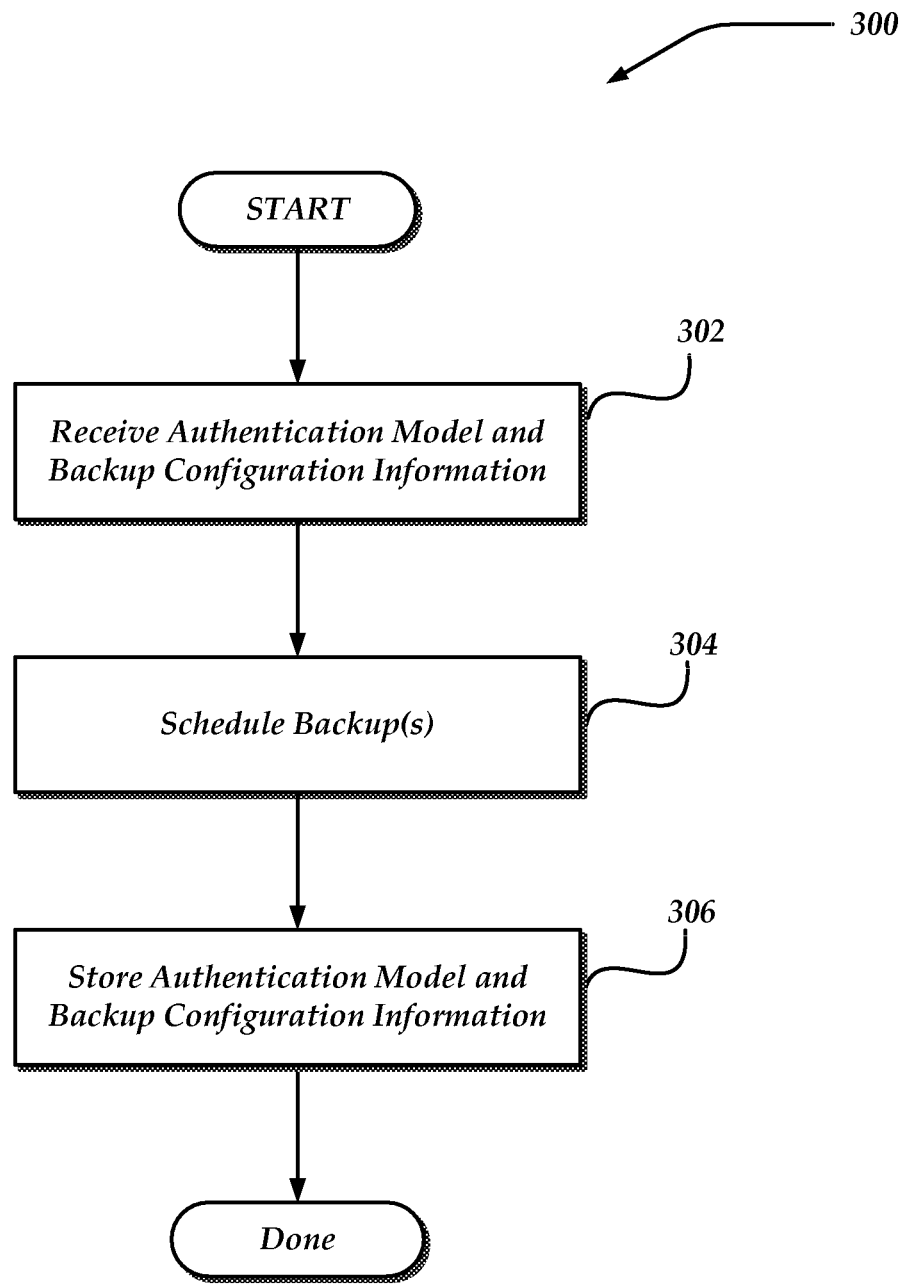
FIG. 3 is a logical flow diagram generally showing a process for initializing a backup system that may be performed by a client computer, in accordance with an embodiment of the present invention.

FIG. 3 is a flow diagram illustrating a process 300 of performing backup initialization tasks by a client device, such as clients 104-106, in accordance with an embodiment of the invention. In one embodiment, process 300 may be invoked in response to receiving backup configuration information or credentials from host server 114. In one implementation, process 300 may be invoked in response to a client receiving backup configuration information and credentials from storage server 102, as described above. In one implementation, process 300 may be invoked by a client device, for example upon booting, waking, coming online, or other event. In various embodiments, at least a portion of process 300 may be performed concurrently with process 200, or with process 300 on another client device.

After a start block, at block 302, the client device receives the authentication model corresponding to the client and backup configuration information from storage server 102, host server 114 or another remote device. Thus, at least two mechanisms may function to provide the client with the authentication model—one providing the data locally, and one remotely. In one embodiment, the backup configuration information, or a portion thereof, is received from a user at the client device, and a client may override any configuration information received from the storage server or host server. The override configuration may be received from a user, stored backup specifications, or from another source. For example, a user may provide specifications of files or data to be backed up, backup schedules, or the like. In some implementations, a portion of the authentication model may be implicit, and does not need to be sent to the client. For example, a directory or username may be a derivation of the client device name, and as such does not need to be sent from the storage server to the client.

In one embodiment, the system may be configured so that the client device attempts to receive backup information and the authentication model from the storage server, and if the storage server is unavailable, receives the data from the host server. Alternately, the client device may attempt to receive backup information from the host server, and if unsuccessful, receives the data from the storage server. In one embodiment, the storage server or the host server may send, or offer to send, the data to a client, and the client may accept the data from either one, based on time received or configured preferences.

Process 300 may flow to block 304, where the received schedule is used to schedule one or more backups. Operating system utilities, such as a task scheduler, or an application program may be used to schedule a backup event to occur at a designated time, periodically, or in response to another event.

Process 300 may flow to block 306, where the authentication model and backup configuration information corresponding to the client are stored at the client for later retrieval. In one implementation, the authentication model is saved in the system context. This allows a backup application running in privileged mode to access it and perform a backup, even if a user is not logged on to the client. Processing may flow to a done block, and return to a calling program.

In various implementations or configurations, actions of process 300 may be performed at different times or in different sequences. For example, at a first time, the authentication model may be received and stored, and at a second time, backup configuration information may be received and used to schedule a backup.

Figure 4:
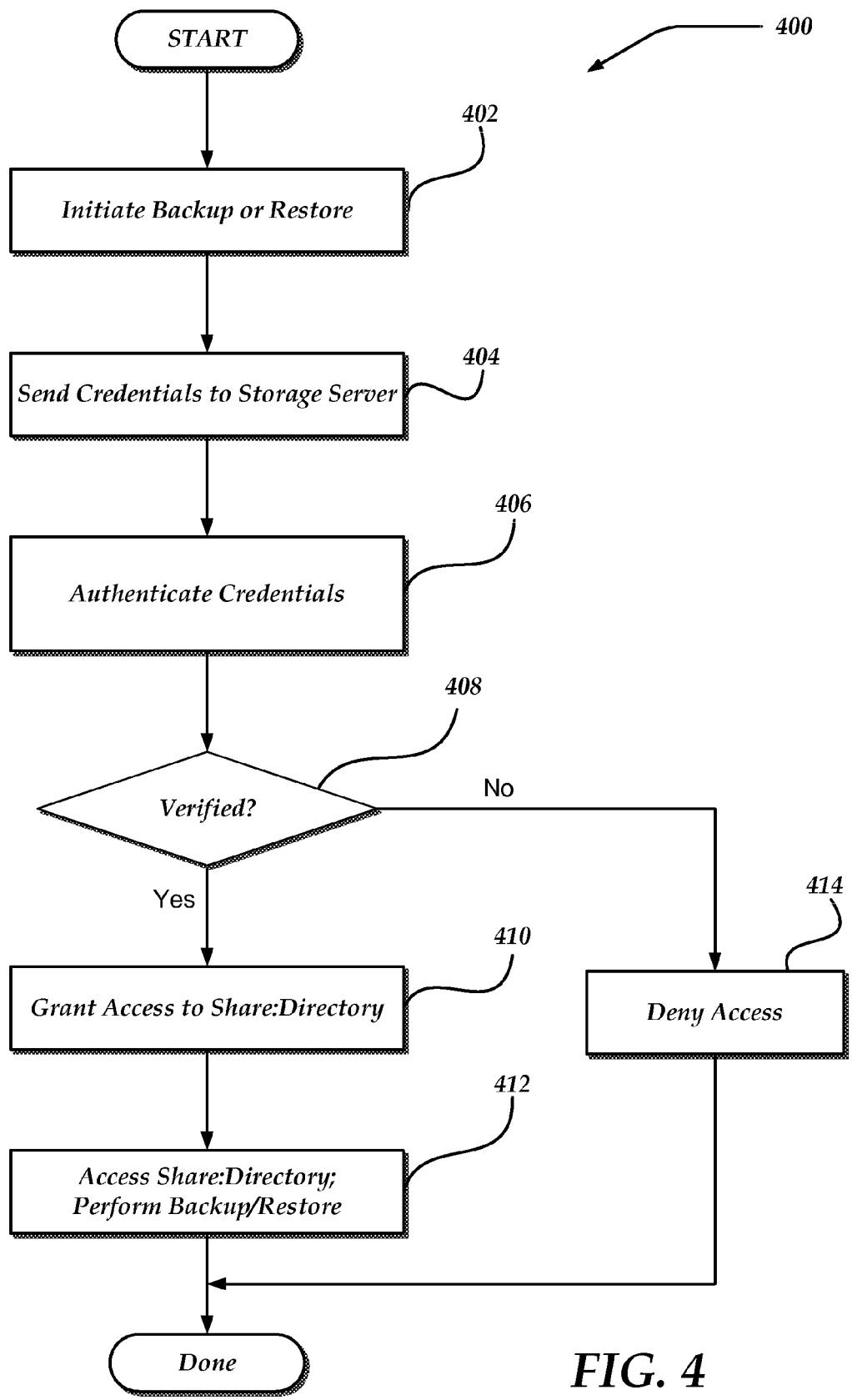
FIG. 4 is a logical flow diagram generally showing a process for performing a backup operation, in accordance with an embodiment of the present invention.

In some configurations, process 300 may be performed without any explicit actions by a user of client device 104 or 106. Authentication information and backup configuration information may be received automatically, and applied to the configuration of the client device. FIG. 4 is a flow diagram illustrating a process 400 of performing a backup or a restore operation, in accordance with an embodiment of the invention. Process 400 may be performed in a system such as backup system 100 of FIG. 1, variations thereof, or another type of system. In one embodiment, process 400 may be performed subsequent to one or more initialization processes, such as process 200 of FIG. 2 or process 300 of FIG. 3.

After a start block, at block 402, a backup or a restore operation is initiated. A backup operation may be invoked as part of a scheduled backup configuration, in which a client system is configured to perform a backup at a specified time, at a periodic time, after a specified time interval, in response to an event, or some other automated mechanism. A backup operation may be invoked manually by a user. In one embodiment, a backup operation may be performed in response to a command or signal from a remote device.

Process 400 may be invoked by a client to perform a restore operation. In this circumstance, the actions of block 402 may include an initiation of a restore operation instead of a backup operation. Block 402 may include any operation invoked by a client to view, verify, or otherwise access the share and directory corresponding to the client, instead of, or in addition to, a backup or restore operation.

Though a share and directory correspond to a client device and credentials, mechanisms of the backup system may allow an alternate client device to replace the original client device configured to be associated with a share and directory. This may occur, for example, if a client device is lost, damaged, or otherwise replaced. A replacement client device having the credentials created for the original client device may be configured to be in the client circle, and may perform restore, backup, or other access operations as described herein for the original client. The original credentials allow authentication to be performed as described herein. A system administrator or user may install the original credentials on the replacement client device. This may be performed by copying or entering the credentials onto the replacement device. This may also be performed by a user at the replacement device logging in to the host server and requesting the credentials. In one embodiment, a second client device in the circle may be enabled to perform backup, restore, or other operations with the share and directory of a first client that has been removed, in addition to the operations with the share and directory of the second client. This may enable, for example, a second client to retrieve files from a first client, provided that the credentials of the first client have been installed onto the second client.

Process 400 may flow to block 404, where a client, such as client 104 or 106, sends its credentials to a storage server, such as storage server 102. In one embodiment, the credentials may include a username and a password corresponding to an account at the storage server. In one embodiment, at least the password is sent to the storage server in an encrypted or otherwise modified form, to provide additional security.

Processing may flow to block 406, where a storage server, in response to receiving credentials from the client, performs an authentication operation to determine whether the credentials verify the identity of the client. In one embodiment, the client password is unknown by other clients, so that knowledge of the password verifies the identity of the client. In one embodiment, the authentication operation includes using the username and password received from the client to attempt a login to the account on the storage server corresponding to the client. The storage server operating system may perform at least a portion of the authentication operation. In one embodiment, an authentication/access component 508 (FIG. 5) performs at least a part of the authentication operation.

In some implementations, credentials received from a client may be pre-processed by a predetermined algorithm prior to authentication. For example, a string may be prepended, appended, or otherwise combined with the received password, or the password may be hashed. As described herein, processes of authenticating a password include such processing, and a modified password is considered within the term password.

Processing may flow to block 408, where a determination is made, based on the authentication operation of block 406, as to whether the client identity has been verified. If, at block 408, it is determined that the client identity has been verified, process 400 may flow to block 410, where the client device is granted access to its corresponding share and directory on data repository 108. The process may flow to block 412, where the client accesses the share and directory identified by its authentication model to perform a backup operation, a restore operation, a view or verify operation, or a combination thereof. The process may flow to a done block, where it terminates or returns to a calling program.

If, at block 408, it is determined that the username and password are not verified, the process may flow to block 414, where the client is refused access to the data repository 108. This may occur if an attempt to login to the client account at the storage server fails. The process may flow to a done block, where it terminates or returns to a calling program. In one embodiment, a message indicative of the failure may be provided to a user or system administrator.

Once initialization of the system, such as referred to in block 402, has been performed, the process 400 may be performed multiple times without performing the initialization. More specifically, backups of client devices, such as illustrated in FIG. 4, may be performed without communication between a client and a host server 114 (FIG. 1), or without communication between storage server 102 and host server 114.

In some configurations, process 400 may be performed without any explicit actions by a user of client device 104 or 106. Process 300 may also be performed without any explicit actions by the user of client device 104 or 106. In such configurations, an administrator may specify configurations at storage server 102, and these specifications may be automatically applied to one or more client devices. Similarly, backups may be performed as scheduled without user intervention. In one configuration, a user of a client device may enter a simple command to initiate a backup operation, and processes described herein may proceed with no additional user intervention.

Figure 5:
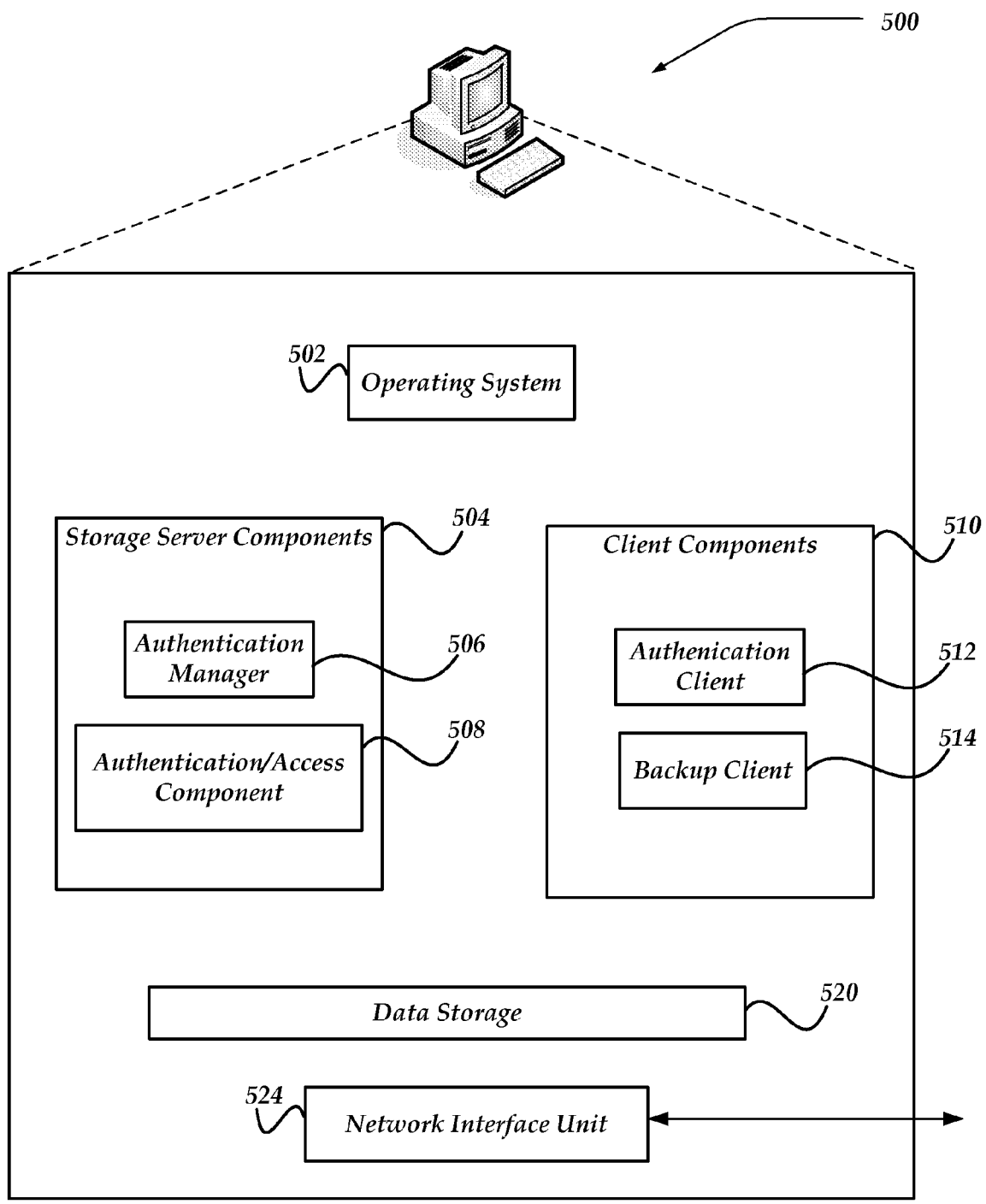
FIG. 5 illustrates an example computing device including components of a storage server and a client device.

FIG. 5 shows one embodiment of a computing device 500, illustrated selected components of a combined storage server and client device that may be used to perform functions described herein and attributed to storage server 102 and client 104 or 106. Portions thereof may be used to perform functions of a storage server 102 or a client device. Computing device 500 may include many more components than those shown, or may include less than all of those illustrated.

Though not illustrated in FIG. 5, computing device 500 may include one or more processing units, a video display adapter, basic input/output system (BIOS), and associated components. Computing device 500 may also include a network interface unit 524 for communicating with a network, such as network 112 of FIG. 1. Network interface unit 524 may also enable computing device 500 to communicate with local computing devices over a local area network or other communications mechanisms. Network interface unit 524, sometimes known as a transceiver or network interface card (NIC) may support various communication protocols, such as TCP/IP. Network interface unit 524 may enable client devices 104 or 106 to communicate with host server 114 or storage server 102 to implement mechanisms described herein, such as retrieving authentication or backup information, or performing backup operations. Network interface unit 524 may enable storage server 102 to communicate with client devices 104 or 106, or host server 114, to implement initialization, authentication, or backup operations.

As illustrated, computing device 500 includes an operating system 502. Storage server components 504 may include program code, data, or hardware components used to perform various functions of the storage server herein described. Two illustrated components are an authentication manager 506 and an authentication/access component 508. The authentication manager 506 may be used to perform functions related to creation and initialization of authentication models, such as those described in FIG. 2. This may include, for example, generation of each authentication model, creation of user accounts, and providing credentials to clients or a host server. The authentication/access component 508 may be used to perform functions related to authentication and access control, such as those described in FIG. 4. This may include, for example, authenticating credentials received from a client and selectively granting access to a share/directory corresponding to the client.

Client components 510 may include program code, data, or hardware components used to perform various function of the client devices herein described. Two illustrated components are an authentication client 512 and a backup client 514. The authentication client may be used to perform functions related to initialization, such as those described in FIG. 3. This may include, for example, receiving an authentication model, including credentials from a storage server or host server. It may also include storing the credentials and other data, and sending it to a storage server to initiate a backup operation. The backup client 514 may receive and store backup configuration information, and perform functions to backup data, restore data from a backup, or other backup operations.

Data storage 520 may include one or more of a variety of types of computer storage media, including volatile or non-volatile memory, RAM, ROM, solid-state memory, disk drives, optical storage, or any other medium that can be used to store digital information. Data storage 520 may be used by storage server components 504 or client components 510 to store respective data.

A computing device that performs functions of a storage server may include storage server components 504. A computing device that performs functions of a client device, such as client devices 104-106, may include client components 510. A computing device that performs functions of a storage server and a client device may include both storage server components 504 and client components 510. In some embodiments, any one or more of the storage server components 504 or client components 510 may be downloaded to computing device 500, from a local or remote server, when they are needed, and discarded when no longer needed.

It will be understood that each block of the flowchart illustrations of FIGS. 2-4, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A system for facilitating a backup operation by one or more of a plurality of client devices, comprising:
   a) a host server remote to the plurality of client devices; and
   b) an authentication component on a storage server located locally to the plurality of client devices, the authentication component configured to perform actions including, for each client device:
   generating credentials including a password corresponding to the client device; sending, to the remote host server, credentials corresponding to the client device;
   receiving from the client, the credentials corresponding to the client device; authenticating the credentials; and
   selectively enabling the client device to access a storage directory associated with the client device, to perform at least one backup operation, based on whether the credentials are verified;
   the remote host server configured to perform actions including:
   receiving, from the authentication component, the credentials corresponding to each client device;
   sending, to each client device, the credentials corresponding to the client device and
   selectively sending, to at least one client device, the credentials corresponding to the at least one client device, based on an availability of the at least one client device to receive the credentials directly from the storage server.

2. The system of claim 1, the storage server further configured to retrieve, from the host server, identification of the plurality of client devices.

3. The system of claim 2, wherein the identification of the plurality of client devices is based on a subscription to a service.

4. The system of claim 1, the authentication component actions further comprising sending, to each client device, the credentials corresponding to the client device.

5. The system of claim 1, wherein the actions of the authentication component further comprise creating the directory associated with each client device at a storage device.

6. The system of claim 1, wherein the storage server is a client device of the plurality of client devices.

7. A system for facilitating a backup operation by one or more of a plurality of client devices, comprising:
   a) means for creating an authentication model corresponding to each client, the authentication model including a password and identification of a storage directory, the means for creating the authentication model is local relative to each client of the plurality of client devices;
   b) a local device that provides each client with the authentication model corresponding to the client; and
   c) a host server, remote to the plurality of client devices, that provides identification of the plurality of client devices, receives the authentication model corresponding to each client, and selectively provides each client with the authentication model corresponding to the client based on whether the client is available to receive the authentication model from the means for locally providing each client with the authentication model corresponding to the client.

8. The system of claim 7, further comprising means for authenticating each client and providing access to a directory corresponding to the client, the directory located at a storage server connected to the means for authenticating.

9. The system of claim 7, further comprising means for authenticating each client, located locally to each client.

10. The system of claim 7, the means for creating the authentication model comprising an authentication manager executing on a computing device connected to a data storage that stores backup data for each client.

11. The system of claim 7, wherein the host server provides identification of a set of clients based on a subscription to a service.

12. A computer-based method of facilitating backup operations for a set of local client devices comprising:
   a) at a local server local to the set of client devices, receiving, from a remote server, an identification of the set of local client devices;
   b) creating a directory on a local centralized storage for each client of the set of local client devices;
   c) at the local server, generating credentials corresponding to each client of the set of local client devices;
   d) sending the generated credentials corresponding to each client from the local server to the remote server;
   e) selectively sending the generated credentials corresponding to each client from the remote server to each corresponding client;
   f) at the local server, in response to receiving a password from a client of the set of local client devices, authenticating the password; and
   g) selectively enabling the client to access the corresponding directory, based on the authentication of the password;
   wherein the local server is a client of the set of local client devices.

13. The method of claim 12, further comprising, at the remote server, sending the identification of the set of local client devices to the local server.

14. The method of claim 12, further comprising enabling the client to receive the credentials from the host server and enabling the client to receive the credentials from the local server.

* * * * *